United States Patent [19]

Carpenter et al.

[11] Patent Number: 4,993,147
[45] Date of Patent: Feb. 19, 1991

[54] AUTOMATED WIRE INSULATION CUTTING AND STRIPPING METHOD WITH IMPROVED MEANS TO PREVENT CONDUCTOR SCORING

[75] Inventors: Thomas S. Carpenter; David D. Hand, both of Cazenovia, N.Y.

[73] Assignee: Carpenter Manufacturing Co., Inc., Manlius, N.Y.

[21] Appl. No.: 402,891

[22] Filed: Sep. 5, 1989

Related U.S. Application Data

[63] Continuation-in-part of Ser. No. 318,672, Mar. 3, 1989.

[51] Int. Cl.[5] .............................................. H01R 43/00
[52] U.S. Cl. ...................................... 29/825; 29/564.4
[58] Field of Search ............................. 29/564.4, 825; 81/9.051

[56] References Cited

U.S. PATENT DOCUMENTS

| | | | |
|---|---|---|---|
| 4,345,362 | 8/1982 | de Givry | 81/9.51 |
| 4,364,289 | 12/1982 | Sorensen | 81/9.51 |
| 4,745,828 | 5/1988 | Stepan | 81/9.51 |
| 4,811,633 | 3/1989 | Bueschel et al. | 81/9.51 |

Primary Examiner—P. W. Echols
Attorney, Agent, or Firm—Charles S. McGuire

[57] ABSTRACT

Methods of cutting and stripping insulation and other coverings from electrical wires, optical cables, and the like, using one or more blades while protecting the wire from undesired scoring or nicking. In one embodiment, two or more blades are moved radially inwardly to cut the insulation to a desired depth, close to the wire, and then moved apart by a short distance before being moved axially to strip the insulation. In a second embodiment, the blades are moved toward one another to cut the insulation to the desired depth, then moved apart by a distance greater than the depth of cut, moved axially by a distance less than the length of the cut, moved toward one another to grip or pinch the insulation and again moved axially to sever and strip the slug of insulation. In a third embodiment a pair of gripper members engage the insulation as the blade or blades cut to the desired depth and strip the slug off the conductor after movement of the blade(s) out of engagement therewith.

22 Claims, 8 Drawing Sheets

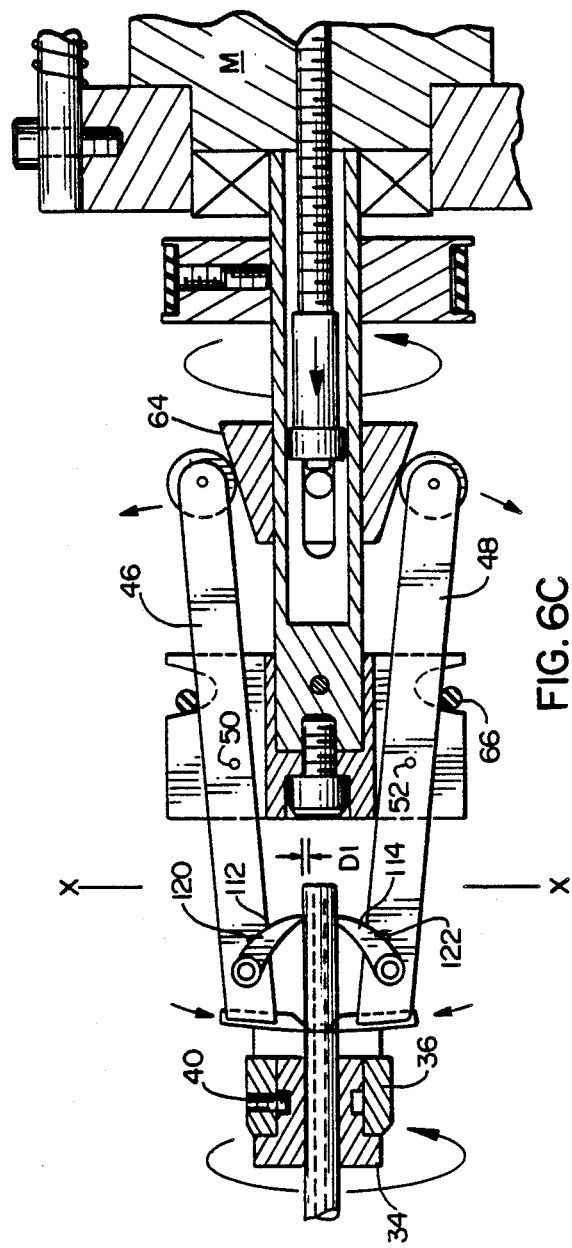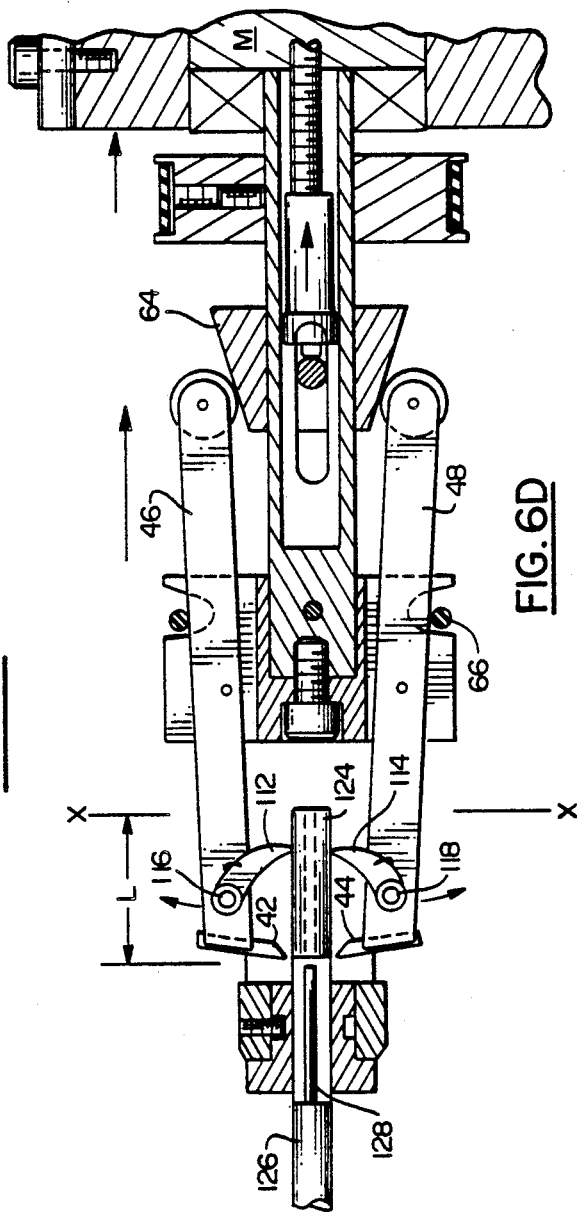

AUTOMATED WIRE INSULATION CUTTING AND STRIPPING METHOD WITH IMPROVED MEANS TO PREVENT CONDUCTOR SCORING

REFERENCE TO RELATED APPLICATION

This is a continuation-in-part of application Ser. No. 318,672, filed Mar. 3, 1989 by the present inventors and others.

BACKGROUND OF THE INVENTION

The present invention relates to automated methods for cutting and stripping insulation or other external layers from an electrical conductor. More specifically, the invention relates to novel insulation cutting and stripping methods wherein one or more blades are moved in a predetermined manner with respect to an insulated conductor held in a fixed position to cut the insulation to a certain depth, less than that of the conductor, and thereafter severing and removing the slug of insulation.

One type of apparatus for cutting one or more layers of material at a predetermined position on a circular cross section conductor is that employing a pair of blades having parallel cutting edges which are rotated about the axis of the conductor as they are moved toward one another. Examples of such apparatus are found in the aforementioned parent application and U.S. Pat. No. 4,745,828 discussed therein. The wire is gripped and held by guide means in a fixed reference position as the rotating blades are moved together until they are spaced by a distance very close to the diameter of the conductor, or other layer of material within the layer being cut. The depth of cut is controlled by a selectively programmable microprocessor.

It is essential that both the longitudinal and lateral positions of the conductor be accurately fixed and maintained during the cutting operation, and that the depth of cut be controlled and repeatable to within very close tolerances, e.g., 0.001", since even minute nicks in the conductor or other inner layers, e.g., woven metal braid, are unacceptable. This is further complicated by the fact that conductors are sometimes not symmetrically located within the one or more layers to be cut and stripped, in which case the conductor is frequently nicked or scored by the blades and must be rejected.

A principal object of the present invention is to provide a method and apparatus for cutting and stripping insulation or other protective layers from electrical conductors without danger of nicking, scraping or scoring the conductor by the movable blades.

Another object is to provide a method and apparatus for cutting and stripping insulation from electrical conductors which does not require extremely precise lateral positioning of the conductor in order to avoid the possibility of damaging the conductor during the cutting and stripping operation.

Other objects will in part be obvious and will in part appear hereinafter.

SUMMARY OF THE INVENTION

In a first embodiment, the invention is described in the context of the apparatus of the parent application, which is incorporated herein by reference, although it will be understood that the invention may be practised with a variety of embodiments of insulation cutting and stripping apparatus having the operational characteristics described herein. It will be further understood that the terms "conductor" and "wire" are used for convenience, since the bulk of the operations are performed on electrical wiring materials, but the invention may also be practised with optical fibers having various types of strippable coverings. The term "insulation" will be understood to include not only electrically insulating coverings, but all types of shielding, insulating, or other types of coverings commonly used in single or multiple layers on electrical conductors and optical fibers. The term "wire" is used to indicate an insulated conductor.

In the first disclosed form, a wire of circular cross section is inserted between a spaced pair of gripping jaws and through an opening in a bushing to abut against the closed edges of a pair of opposed cutting blades. The gripping jaws are closed to hold the wire firmly in position, the blades are opened and advanced axially along the wire (together with the wire guide bushing) for a distance equal to the desired length from the end of the wire to the position at which the insulation is to be cut. The blades are then rotated about an axis substantially concentric with that of the conductor as they are moved radially inwardly to cut the insulation to a first, predetermined depth. The depth of cut is, of course, determined by the spacing of the blades, inward movement and rotation of which are stopped at a first spacing greater than the diameter of the conductor.

The blades are then moved inwardly, without rotation or other lateral movement with respect to the wire, to a second spacing, less that the first spacing, but still greater than the diameter of the conductor. Examples of preferred first and second blade spacings are discussed later herein. The blades are then axially retracted, thereby breaking the uncut portion of the slug of insulation from that remaining on the conductor, and stripping the severed slug from the conductor. The operations may be carried out automatically in response to dimensional values and instructions inserted via a keyboard into a microprocessor which controls operation of digital stepper motors, as in the apparatus of the parent application, or by other automatic, semi-automatic or manual means.

The invention is described in a second embodiment useful in connection with cutting and stripping flat cable wherein a plurality of conductors are arranged in spaced, parallel relation within a body of insulation. The cable is held in position by suitable clamping means as a pair of blades having parallel cutting edges positioned on opposite sides of the cable are advanced toward one another while moving laterally in opposite directions. Inward movement is stopped when the blades reach a predetermined depth of cut, being spaced by a desired distance in excess of the diameter of the conductors. The blades are then moved apart by a distance sufficient to clear the insulation and moved rearwardly a short distance where they are still adjacent the partially severed slug of insulation. They are then moved inwardly again by a distance sufficient to pinch the insulation firmly between the blades, and moved rearwardly to complete the severing of the slug from the insulation remaining on the conductors, and strip the slug from the exposed ends of the conductors.

A third disclosed embodiment may be practised with the apparatus of the first embodiment, modified by the addition of a pair of one-way engagement means respectively mounted on the two arms which carry the cutter blades. As the blades are moved forwardly to he desired length of cut, the ends of the engagement members contact the end of the wire and are rotated against a spring bias by continued movement of the blades and arms, placing an end portion of the wire between the engagement members. The arms are rotated as the blades are moved inwardly to cut the insulation to a desired depth, somewhat less than the diameter of the conductor or other layer from which the insulation is to be stripped, as in the first embodiment. The blades are then moved outwardly, without rotation, while end portions of the engagement members remain engaged with the insulation due to the spring bias on the members. The arms carrying the blades and engagement members are then moved linearly, away from the wire, completing the severing of the slug of insulation and stripping it from the conductor by the engagement members.

The foregoing and other features of the invention will be more fully understood and appreciated from the following detailed description, taken with the accompanying drawings, wherein:

BRIEF DESCRIPTION OF THE DRAWINGS

FIGS. 6a–6d are a series of fragmentary, side elevational views illustrating operation of the third embodiment.

DETAILED DESCRIPTION

Figure 1:
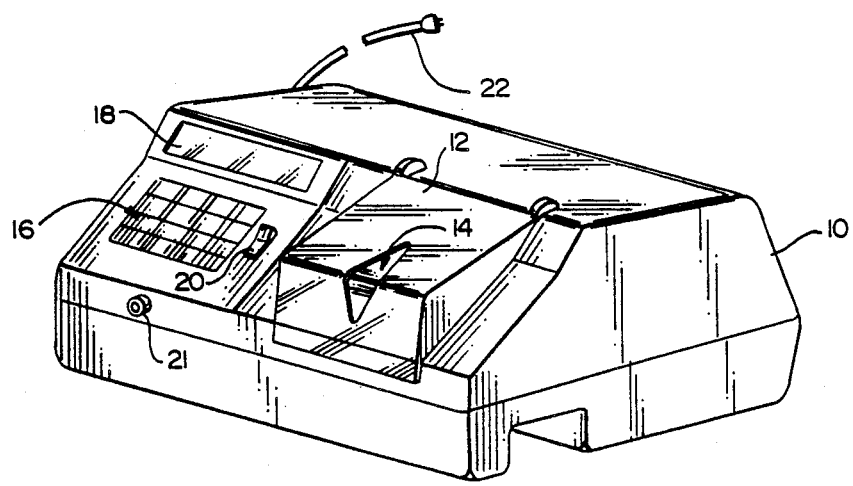
FIG. 1 is a perspective view of a fully assembled, automated machine of a type which may be used in practising the invention.

As described in parent application Ser. No. 318,672, to which reference may be made for constructional and operational details not repeated at length herein, the apparatus shown in FIG. 1 includes mechanical and electrical elements enclosed by protective casing 10. Hinged, transparent guard 12 is mounted on the front side of casing 10 and includes opening 14, providing access to the wire insertion location. Keyboard 16 and visual display 18 are likewise mounted on the front of casing 10, as are power switch 20 and start switch 21. The apparatus is connected to a source of electrical power by cord and plug 22. The mechanical elements shown in FIGS. 2 and 4a–4g are housed within the right-hand side of casing 10, as viewed from the front, and a microprocessor and other electronic elements are housed in the left-hand side. The microprocessor is of conventional design, suitable for accepting inputs from keyboard 16 and generating outputs to operate visual display 18 and to control operation of the mechanical elements of the apparatus.

Figure 2:
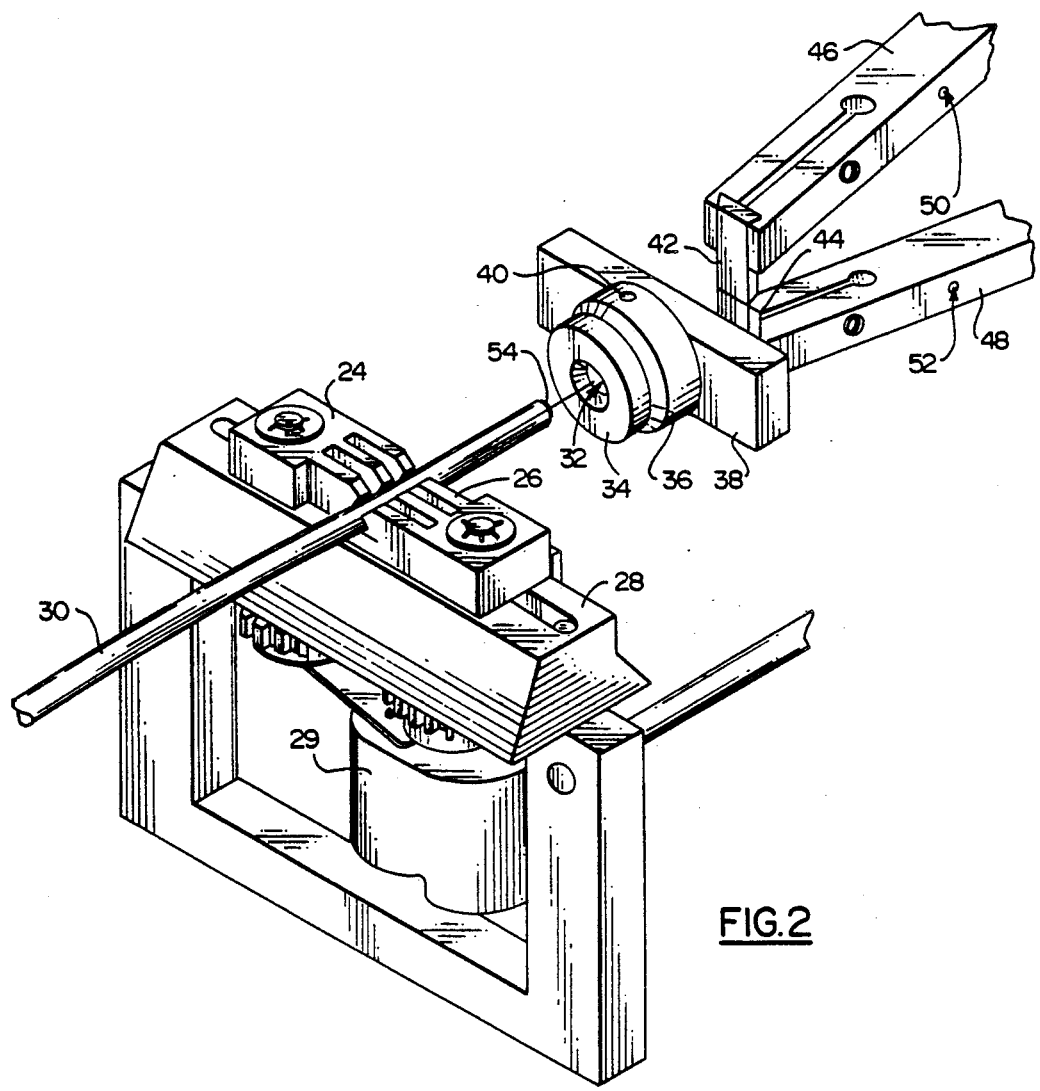
FIG. 2 is a fragmentary, perspective view of portions of the apparatus of FIG. 1.

Referring now to FIG. 2, the apparatus includes a pair of reciprocally movable gripper jaws 24 and 26 mounted for sliding movement on block 28, forming a portion of the rigid framework of the apparatus. Gripper jaws 24 and 26 are movable toward and away from one another by reversible motor 29, connected to the jaws by means described more fully in application Ser. No. 318,672. Wire 30 comprising one or more insulating or other such layers covering a central conductor, is advanced axially by an operator through slot 14 in cover 12, between spaced gripper jaws 24 and 26, and through opening 32 in bushing 34 which serves to guide and position wire 30. Bushing 34 is removably held in forward portion 36 of yoke structure 38 by set screw 40.

Cutter blades 42 and 44 are mounted upon forward end portions of pivot arms 46 and 48, respectively. In the position shown in FIG. 2, the parallel cutting edges of blades 42 and 44 are in contact with one another. As described later, arms 46 and 48 are pivoted about axes through openings 50 and 52 for the arm mounting pins (not shown). Wire 30 is inserted until terminal end 54 thereof abuts against blades 42 and 44 which serve as a stop for and establish the axial reference position of wire 30.

Figure 3:
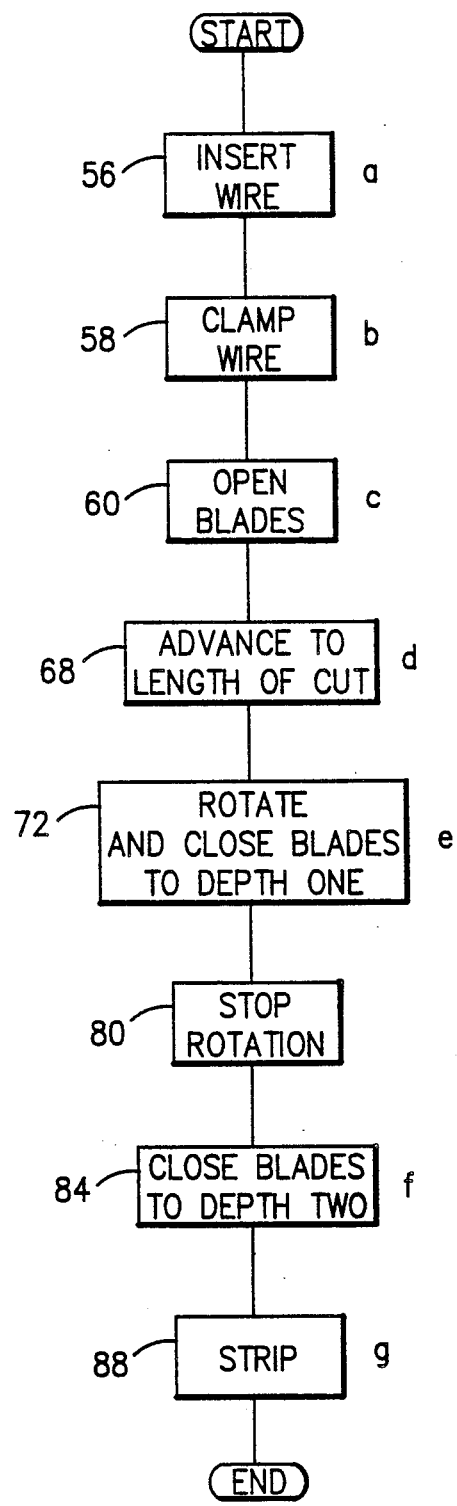
FIG. 3 is a flow diagram indicating the succession of steps involved in a first embodiment of the invention.
Figure 4A:
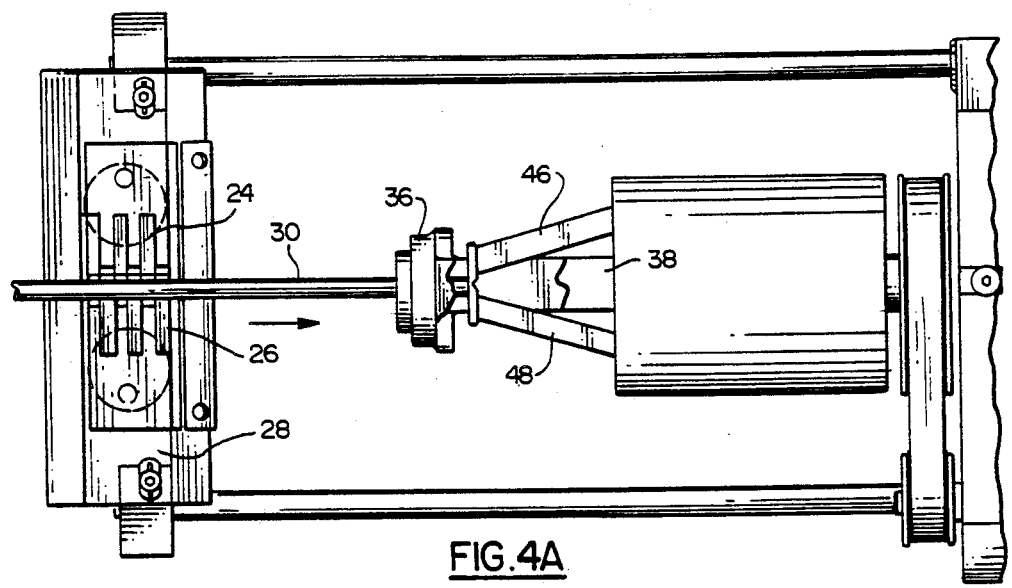
FIGS. 4a–4g are a series of fragmentary, top plan views, FIGS. 4c–4g being in section, illustrating operation of the apparatus in performing the sequential steps indicated in FIG. 3.
Figure 4B:
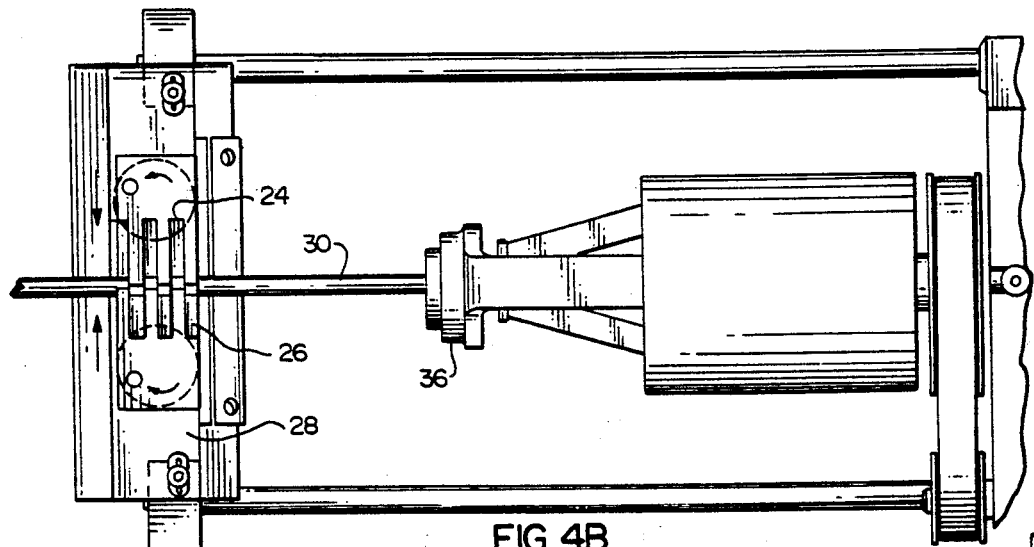
Figure 4C:
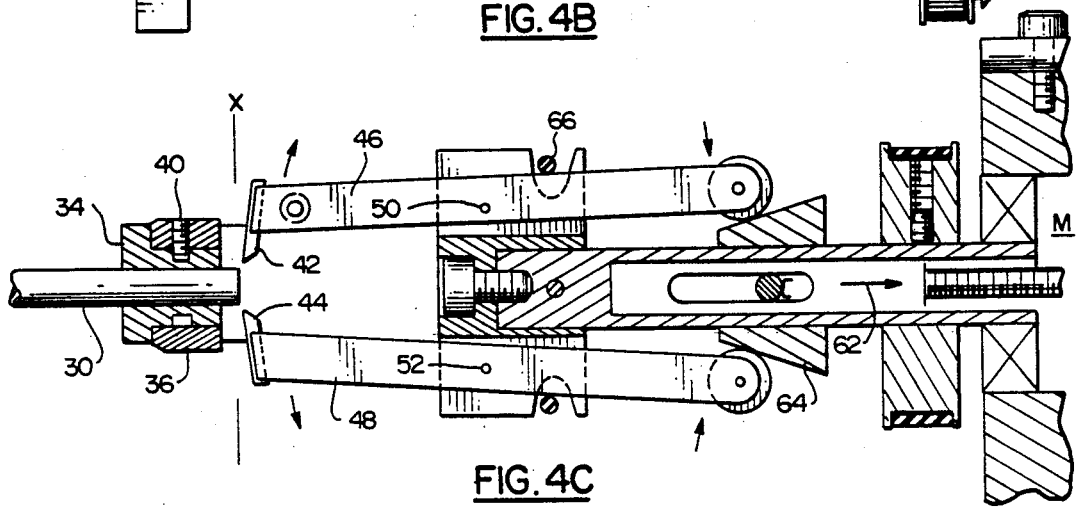

The diagram of FIG. 3 provides a convenient reference for following the sequence of steps involved in the first described embodiment of the invention, taken in conjunction with FIGS. 4a–4g. Blocks 56 and 58 indicate the steps described above of inserting wire 30 between spaced gripper jaws 24 and 26 and through bushing 34 until end 54 abuts against closed blades, as shown in FIG. 4a, and clamping wire 30 by closing jaws 24 and 26, as shown in FIG. 4b. Block 60 indicates the step of opening, i.e., the radial moving apart of, blades 42 and 44. This is illustrated in the sectional view of FIG. 4c; such movement of the blades is produced by rearward movement, indicated by arrow 62, of conical element 64, thereby causing pivoting movement of arms 46 and 48 about respective axes through openings 50 and 52, due to the biasing force of resilient O-ring 66.

Figure 4D:
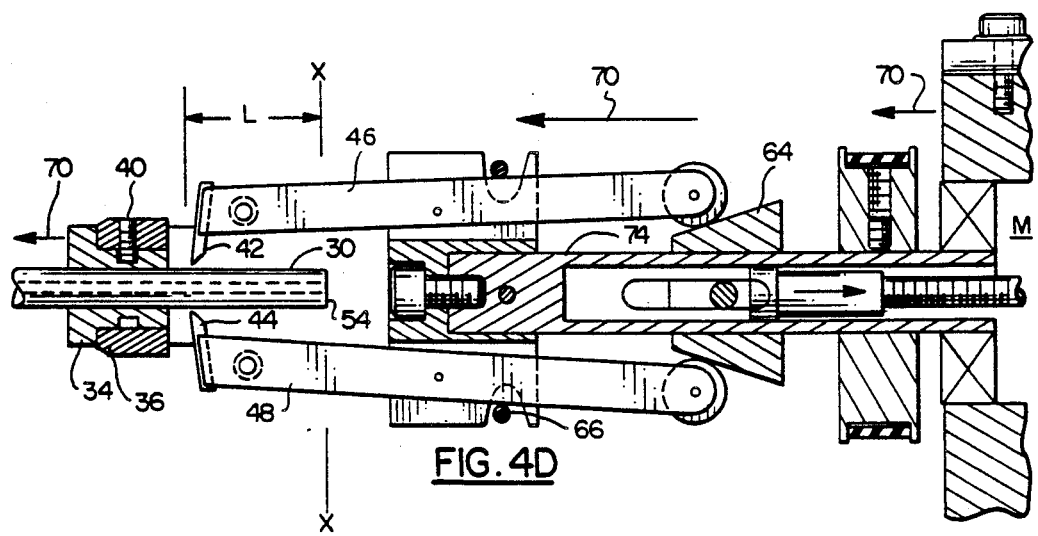

As indicated by block 68 and shown in FIG. 4d, the elements are then advanced in the direction of arrows 70 from reference position X—X of end 54 of wire 30 by a distance L. All elements shown in FIG. 4d are mounted for common movement on a reciprocating carriage by a linear actuator or digital stepper motor under the control of the microprocessor, all as fully described in application Ser. No. 318,682. Distance L, representing the length from wire end 54 at which the insulation is to be cut, is electrically entered in the microprocessor by the operator via keyboard 16 prior to commencement of the cutting and stripping operation, as is the desired depth of cut.

Figure 4E:
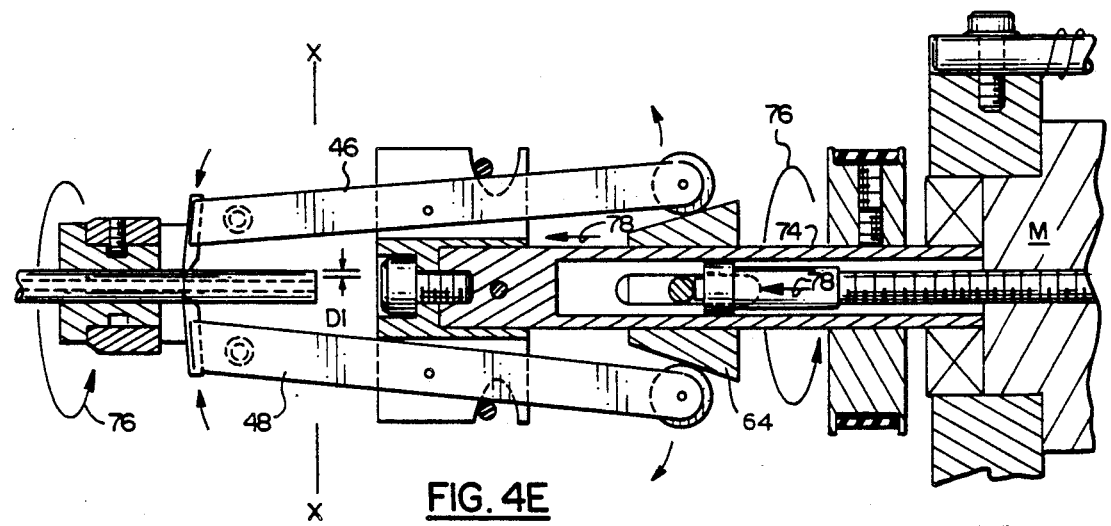
Figure 4F:
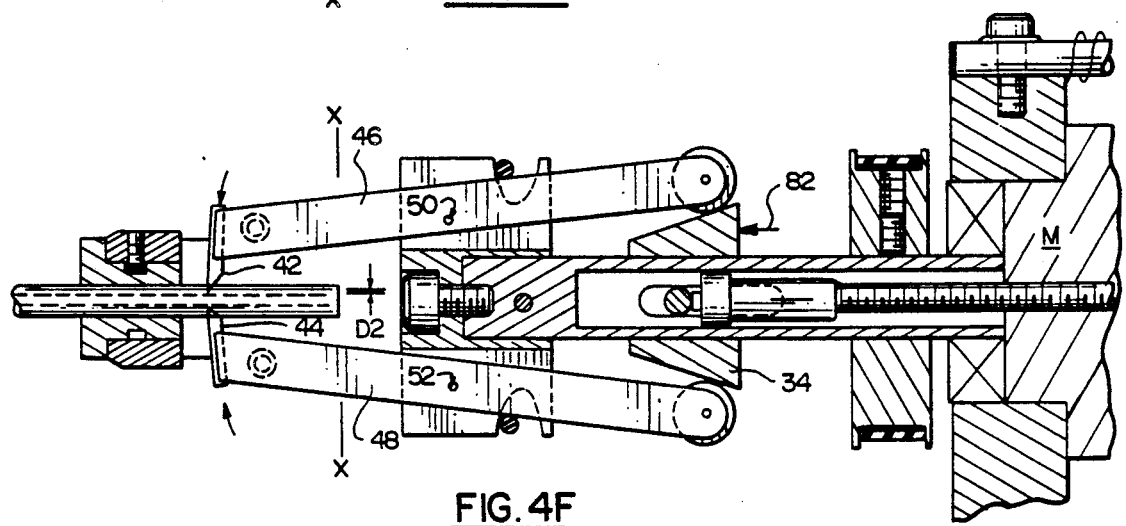

The next step in the operation, indicated by block 72, is the simultaneous rotation of shaft 74 and the elements mounted thereon, including blades 42 and 44 and bushing 34, and radially inward movement of the blades. Rotation is indicated in FIG. 4e by arrows 76, and forward movement of conical element 64, causing arms 46 and 48 to pivot and move blades 42 and 44 radially inwardly, by arrow 78. Rotation is stopped, as indicated by block 80, and inward movement of the blades is likewise stopped, when the insulation has been cut to a depth indicated in FIG. 4e as D1. Next, without further rotation of blades 42 and 44, conical element 64 is moved forwardly by an additional increment as indicated by arrow 82 in FIG. 4f, causing further radially inward movement of the blades to cut the insulation on both sides to additional depth D2, this step being indicated in FIG. 3 by block 84.

Figure 4G:
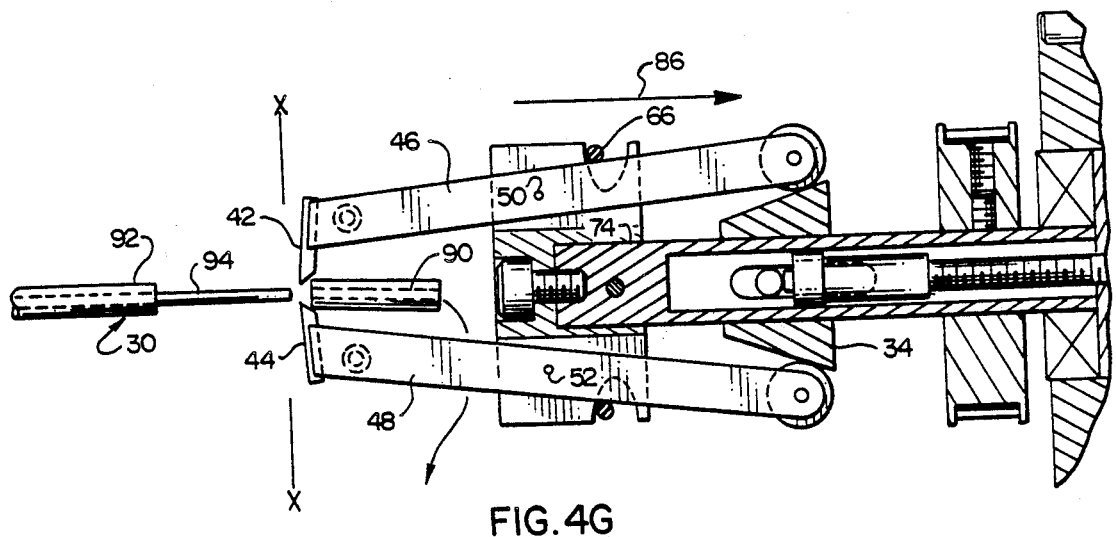

After the closing of blades 42 and 44 to depth D2, the carriage and elements carried thereon are retracted, i.e., moved in the direction of arrow 86 in FIG. 4g, to return the blades to their original position X—X in alignment with end 54 of wire 30. This step is indicated in FIG. 3 by block 88. During such movement, the blades break the severed slug of insulation, indicated in FIG. 4g by reference numeral 90, away from insulation 92 remaining on wire 30 and strip it off of conductor 94. Length L of conductor 94 extending from terminal end 54 of wire 30 is thus exposed, as desired. Gripping jaws 24 and 26 are moved apart at the conclusion of the cutting and stripping operation, and wire 30 is removed from the apparatus.

In prior art methods and apparatus in which insulation was cut and stripped from a central conductor by simultaneous movement of one or more blades radially and transversely with respect to the conductor axis, followed by axial movement to strip the severed slug, it has been conventional to close the blades to a distance on the order of 0.004" in excess of the conductor diameter. Assuming the conductor to be precisely positioned coaxially with radial and rotational movement of a pair of opposed blades, the cutting edges of the blades will thus be positioned about 0.002" from each side of the conductor. As previously mentioned, this requires not only highly precise control of blade movement, but also very close tolerances on the radial (i.e., lateral) positioning of the wire. Consequently, in a positioning system such as that shown in the accompanying drawings, opening 32 in the wire guide bushing 34 must be quite close in diameter to the wire being operated upon.

When the present invention is practised with automated apparatus such as that shown herein and described in greater detail in application Ser. No. 318,672, instructions are entered via the keyboard interface in the same manner as before. That is, the operator places power switch 20 in the "on" position and enters instructions for the job to be performed into the microprocessor via keyboard 16. Such instructions will include at least one length of cut dimension (L), and one depth of cut dimension. The latter dimension may be, for example, the spacing of the blade cutting edges at the first depth of cut, when rotation is stopped. The operator would arrive at this value by adding to the diameter of the conductor a desired dimension, e.g., 0.010" or 0.012". Depending upon the programming of the microprocessor, the value could be the diameter of the conductor, or the second depth of cut, with the apparatus being controlled to stop rotation and the first depth of cut when the blades are spaced by the desired distance from the conductor.

When entry of the instructions is complete, the operator presses the "enter" button on the keyboard, whereupon the elements are moved to their starting positions. The wire is then inserted between the gripping jaws and through the wire guide bushing until the terminal end of the wire abuts the closed blades. The operator then presses start button 21, and the sequence of operations described in FIG. 3 proceeds automatically. The microprocessor is programmed to open the blades, move them axially by distance L and commence rotation and inward radial movement of the blades. Rotation and inward movement are stopped by action of the microprocessor when the cutting edges of the blades are spaced by a distance exceeding the conductor diameter by a first, predetermined amount, e.g., about 0.010" to 0.012". The blades are then further moved inwardly (without rotation), by action of the microprocessor, to a position where the edges are spaced by a distance exceeding the conductor diameter by a second, predetermined amount, e.g., 0.006". That is, assuming accurate positioning of the wire each blade will be spaced from one side of the conductor by 0.006" when the blades have cut to the first depth, and by 0.003" when they have cut to the second depth. Thus, even if tee wire is not precisely positioned, or if the conductor is not exactly symmetrically disposed along the axis of the wire, the possibility of nicking or scoring the conductor by the cutter blades is substantially reduced, particularly since the cut is made from the first to the second depth without blade rotation.

Although wire 30 is shown as having only a single layer of insulation 92 on conductor 94, the invention may, of course, be practised with wires having multiple layers of insulation or other covering material, with cuts made at various lengths. In any case, the microprocessor is programmed to control the depth of cuts and sequence of cutting operations in the manner described. Also, while the best mode of effecting the initial cutting of the insulation has been described as rotation of the blades as they are moved radially inwardly, the invention contemplates and is intended to encompass other types of cutting. It is, however, necessary within the scope of the invention that the initial cutting operation be performed while moving at least one blade both transversely, which term is intended to encompass but not be limited to rotational movement, and radially inwardly with respect to the conductor. The second cutting operation is performed in the first described embodiment, simply by moving the blades radially inwardly by another increment, without transverse movement.

Figure 5:
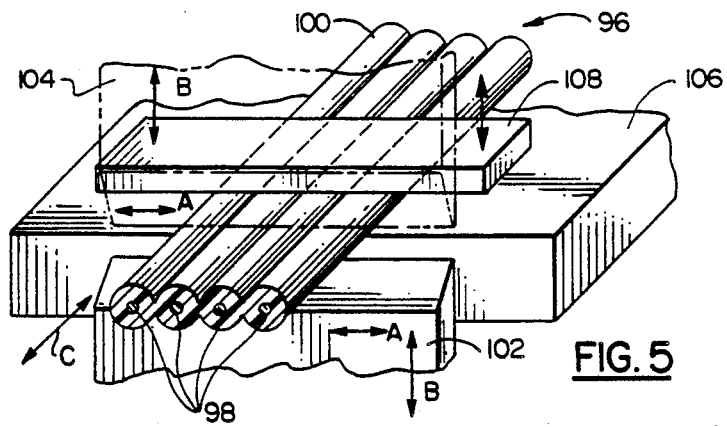
FIG. 5 is a somewhat diagrammatic, fragmentary, perspective view of apparatus used in practising a second embodiment of the invention.

Turning now to FIG. 5, the invention will be described in another embodiment, suitable for use with flat wire cables, wherein a plurality of conductors are arranged in spaced, parallel, side-by-side relation within a body of insulation. A typical form of such flat wire cable is shown in FIG. 5, indicated generally by reference numeral 96, comprising conductors 98 positioned within insulation 100. A pair of cutter blades 102 and 104 are positioned with their cutting edges parallel and are mounted by suitable support means (not shown) for reciprocal, linear movement in opposite, orthogonal directions both laterally, as indicated by arrows A, and toward and away from one another, as indicated by arrows B, as well as axially with respect to cable 96 (arrows C).

Figure 5A:
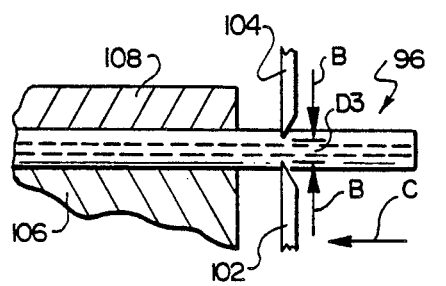
FIGS. 5a–5e are a series of fragmentary side elevational views showing the succession of steps in the method of the second embodiment.

Cable 96 is positioned on table 106 and held firmly by reciprocally movable clamp 108. The axial position of cable 98 may be established as before, i.e., by abutting the terminal end thereof against the closed blades. The blades are then moved apart (arrows B) and moved linearly (arrows C) by the desired length of cut. When at the proper position axially of cable 98, blades 102 and 104 are simultaneously moved both laterally (arrows A) and toward one another (arrows B) to cut insulation 100 to depth d3, as shown in FIG. 5a. The spacing between the blades at this time is equal to the diameter of conductors 98 plus a dimension such as 0.010" or 0.012". Thus, even if conductors 98 are not symmetrically arranged within insulation 100, there is not a great likelihood that any conductor will be damaged by contact of one of the blades.

Figure 5B:
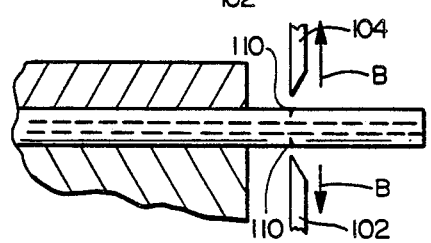
Figure 5C:
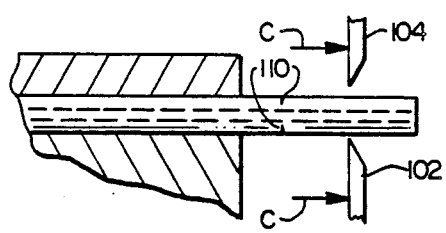
Figure 5D:
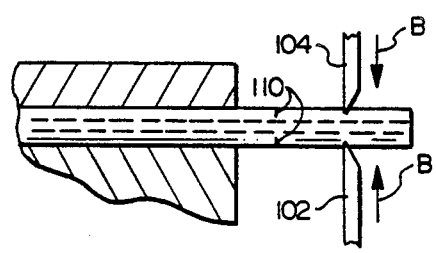
Figure 5E:
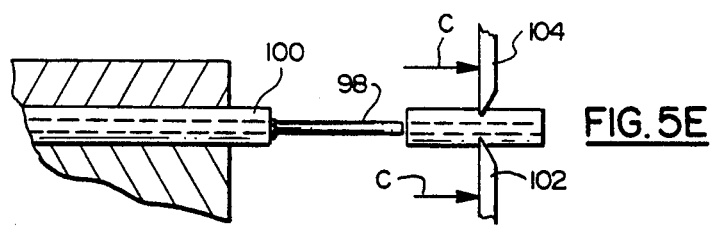

After movement of the blades to depth d3, the blades are again moved away from one another, as indicated by arrows B in FIG. 5b, leaving cuts 110 in each side of the insulation. The blades are then moved axially of the cable, back toward the terminal end thereof, but by a distance less than the length of cut, i.e., the initial movement of the blades to the position of the cuts. This is indicated by arrows C in FIG. 5c. The blades are then moved toward one another to engage the insulation firmly therebetween, as shown in FIG. 5d, at a position between cuts 110 and the terminal end of cable 96. The insulation need not be cut, at least not to any significant depth, but simply pinched firmly between the blades. The blades are once again moved axially of the cable, as indicated by arrows C in FIG. 5e, to complete the severing of the insulation at the position of cuts 110, and strip the severed slug of insulation from conductors 98, leaving the desired exposed length of the conductors without substantial danger of cutting, nicking or other damage thereto.

Figure 6:
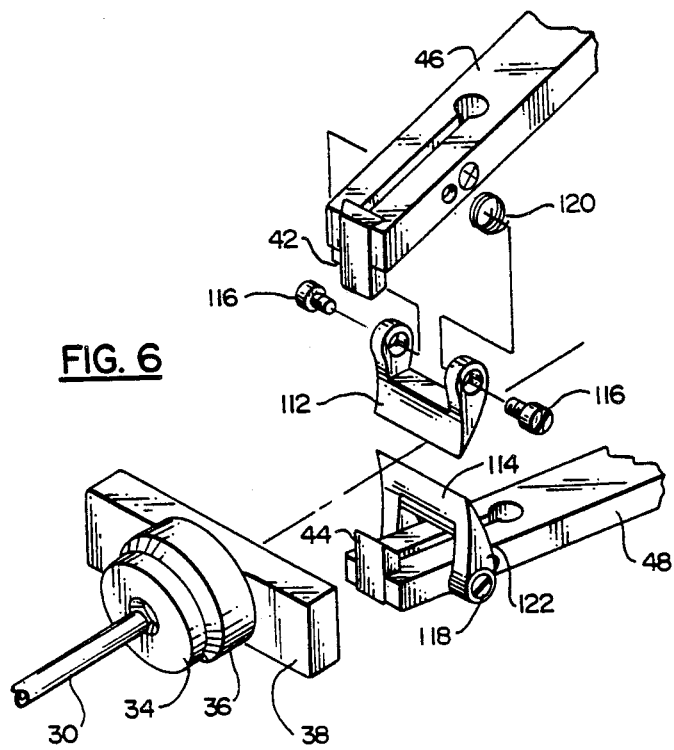
FIG. 6 is a fragmentary, perspective view of portions of the apparatus of FIG. 2 with additional elements which cooperate to provide a third embodiment of the apparatus and method of the invention.

A third embodiment of the invention is illustrated in FIGS. 6 and 6a–6e. The same apparatus is used as in the embodiment of FIGS. 1, 2 and 4a–4g, and common reference numerals denote the same elements in the present embodiment, except for the addition of engagement elements 112 and 114. Elements 112 and 114 are mounted for reciprocal, pivotal movement about pins 116 and 118, respectively, and are biased by springs 120 and 122 toward movement in clockwise and counter-clockwise movement, respectively, as viewed in FIGS. 6a–6d. Such movement is limited by contact of the terminal ends of the elements with one another (FIG. 6a) or with the insulation of a conductor positioned therebetween (FIGS. 6c–6e).

Figure 6A:
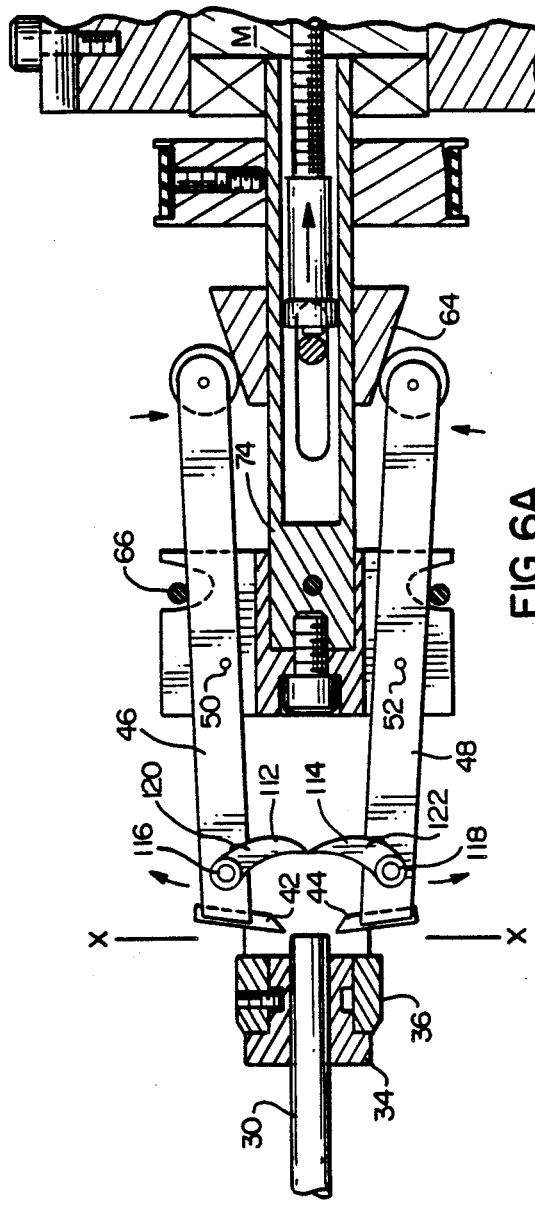

According to the present embodiment, after wire 30 is positioned with its terminal end abutting the closed blades, and the blades are moved to the open position, as in FIG. 6a, the carriage travels to the left to move all illustrated elements except wire 30 by distance L, the preprogrammed length of cut, in the same manner as in the first embodiment. During such movement, the terminal ends of elements 112 and 114 contact the end of wire 30, and continued movement of the carriage causes rotation of the engagement elements in directions opposite to that of the spring bias on each. The apparatus is thus positioned as shown in FIG. 6b.

The illustrated elements are then rotated while moving conical element 64 forwardly to cause inward pivoting movement of the forward ends of arms 46 and 48, such movement continuing until blades 42 and 44 reach the pre-programmed depth of cut D-1. During this inward movement of the arms and blades, additional pivoting movement of engagement elements 112 and 114 occurs, but the end portions thereof remain in engagement with the insulation on wire 30, the elements being positioned as shown in FIG. 6c.

Figure 6B:
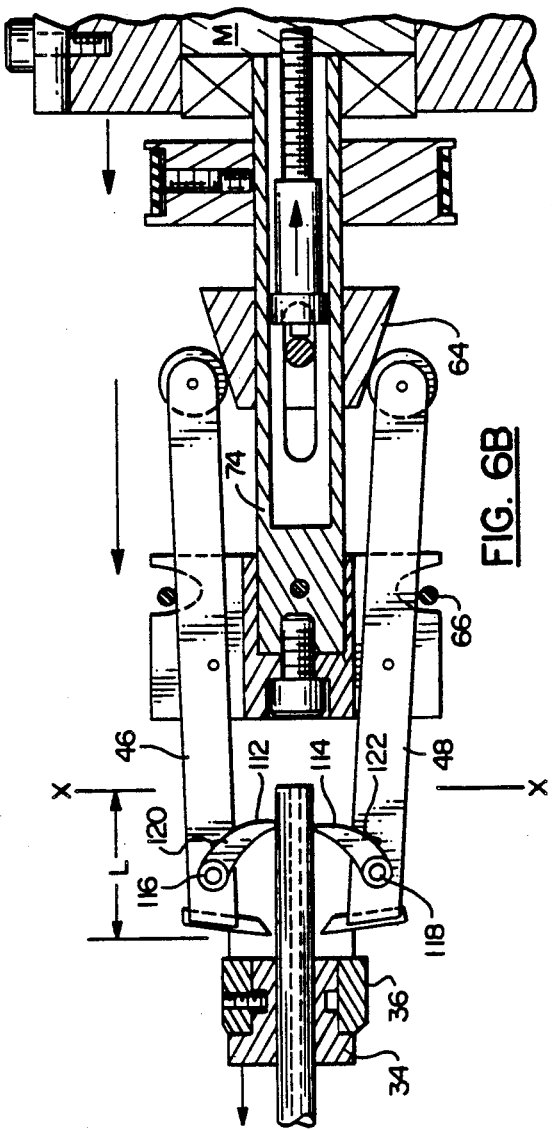

Conical element 64 is then moved rearwardly to cause blades 42 and 44 to move apart, out of engagement with the insulation, i.e. back to the position of FIG. 6b. The carriage then moves back toward the right, as indicated by the arrows in FIG. 6d, by distance L, returning the elements to their positions of FIG. 6a. Due to the one-way positive engagement of elements 112 and 114, slug 124 is severed from the remainder of insulation 126 and stripped from the thus exposed portion 128 of the conductor of wire 30. That is, the configuration and pivotal mounting of elements 112 and 114 relative to the respective directions of their spring biasing allows the terminal ends thereof to move freely over the insulation in one direction while positively engaging, severing and stripping it from the conductor when moved in the opposite direction.

From the foregoing, it may be seen that the invention provides an apparatus and method for severing and stripping a slug of insulation from an end portion of an electrical conductor while essentially eliminating the possibility of cutting, scraping, or otherwise damaging the conductor. In one embodiment, the cutting blades are first rotated to make a cut entirely around the insulation of a cylindrical wire to a first depth, then moved inwardly without rotation to increase the depth of cut on opposite sides to a second depth, and then moved away from the wire to complete severing of the slug of insulation and strip it from the conductor. In a second embodiment, suitable for applications with flat cable having a plurality of spaced, parallel conductors in a body of insulation, the blades are moved laterally in opposite directions while being moved toward one another to cut the insulation to a desired depth, wherein the blades are safely spaced from the conductors; the blades are then moved apart to release the insulation, moved linearly to a position on opposite sides of the partially severed slug of insulation, moved toward one another to engage the insulation firmly therebetween, and moved linearly to complete severing of the slug and strip it from the conductors. In a third embodiment, a pair of one-way engagement members move linearly together with the blades by the desired length of cut with the insulation positioned between terminal ends of the engagement members. The rotating cutter blades then move inwardly to cut the insulation to a depth wherein the blades are safely spaced from the conductor, and the blades are moved outwardly to disengage from the insulation. As the blades and engagement members are linearly retracted, the slug of insulation is severed from the portion remaining on the conductor and stripped from the exposed end of the conductor by positive engagement therewith of the engagement members in this direction of movement.

What is claimed is:

1. A method of cutting and stripping a layer of insulation from an end portion of a wire comprising an electrical conductor surrounded by said insulation, said method comprising:
   (a) positioning and holding a linear portion of said wire extending from a terminal end thereof with said conductor lying substantially upon a predetermined axis;
   (b) positioning at least two cutter blades in a first position wherein cutting edges of said blades are spaced from one another and from said insulation at substantially equal distances from said axis, said edges lying in a plane transverse to said axis at a first predetermined distance from said terminal end, said first predetermined distance equaling the desired length of insulation to be cut and stripped from said end portion;
   (c) moving said cutting edges simultaneously both transversely and radially inwardly with respect to said axis to a second position wherein said edges are spaced from said conductor by substantially equal, second predetermined distances;
   (d) stopping said transverse movement and moving said edges simultaneously radially inwardly with respect to said axis to a third position wherein said edges are spaced from said conductor by substantially equal, third predetermined distances; and (e) moving said blades simultaneously in a direction parallel to said axis toward said terminal end, thereby severing said insulation and stripping the severed portion from said end portion of said wire.

2. The method of claim 1 wherein said transverse movement is produced by rotation of said blades about said axis.

3. The method of claim 2 wherein said second predetermined distances are at least about 0.010".

4. The method of claim 3 wherein said third predetermined distances are at least about 0.003".

5. The method of claim 1 wherein said blades are mounted upon and moved by apparatus under the control of a microprocessor responsive to keyboard inputs and including the further step of entering into said microprocessor via said keyboard values commensurate with said first and second predetermined distances.

6. The method of claim 5 wherein said microprocessor is preprogrammed to control said apparatus to move said blades automatically from said second to said third position.

7. The method of claim 6 wherein said transverse movement comprises simultaneous rotation of said blades about said axis.

8. A method of cutting a layer of insulation covering an electrical or optical conductor, said method comprising:

(a) positioning and holding a linear portion of said insulation-covered conductor in a first, fixed position on a predetermined axis;

(b) positioning the cutting edges of at least two cutter blades in spaced relation at radial distances from said axis great enough to permit said insulation-covered conductor to pass through the space between said edges;

(c) moving said cutting edges simultaneously in directions both transversely and radially inwardly with respect to said axis to a first position wherein said cutting edges each extend into said insulation and are spaced from said conductor by first, predetermined distances;

(d) stopping said transverse movement and moving said edges simultaneously radially inwardly with respect to said axis to a second position wherein said edges are spaced from said conductor by second, predetermined distances.

9. The method of claim 8 wherein said transverse movement is produced by rotation of said blades about said axis.

10. The method of claim 9 wherein said first distances are at least about 0.010".

11. The method of claim 10 wherein said second distances are at least about 0.003".

12. The method of claim 8 wherein the number of said blades is two and said cutting edges are positioned substantially parallel to one another on opposite sides of said conductor.

13. A method of severing and stripping a predetermined length of insulation extending from a terminal end of a wire comprising at least one electrical conductor surrounded by said insulation said method comprising:

(a) positioning said terminal end of said wire at a reference position;

(b) positioning a pair of blades with opposed cutting edges on opposite sides of said wire in an initial position at a distance from said terminal end equal to said predetermined length;

(c) moving said blades simultaneously both laterally and toward one another to a position wherein said cutting edges extend into said insulation and are substantially equally spaced from said conductor by predetermined distances on opposite sides thereof;

(d) moving said blades away from one another to a position wherein said cutting edges are spaced outwardly from said insulation;

(e) moving said blades toward said terminal end of said wire to a position wherein said cutting edges are positioned on opposite sides of said wire between said initial position and said terminal end;

(f) moving said blades toward one another to engage said insulation firmly therebetween; and (g) moving said blades toward said terminal end of said wire with said insulation engaged therebetween, thereby severing said predetermined length of insulation and stripping it from said conductor.

14. The method of claim 13 wherein said wire is flat cable comprising a plurality of spaced parallel conductors all embedded within a unitary body of insulation.

15. The method of claim 14 wherein said lateral movement of said blades is performed by moving said cutting edges linearly in opposite lateral directions while simultaneously moving said cutting edges linearly toward one another.

16. The method of claim 13 wherein said wire comprises an electrical conductor of circular cross section substantially symmetrically surrounded by a layer of insulation also of circular cross section.

17. The method of claim 16 wherein said lateral movement of said blades is performed by moving said cutting edges rotationally about an axis substantially coaxial with said conductor while simultaneously moving said cutting edges radially inwardly toward one another.

18. The method of severing and stripping a predetermined length of insulation extending from a terminal end of a wire comprising at least one electrical conductor surrounded by said insulation, said method comprising:

(a) positioning and holding a linear portion of said wire extending from a terminal end thereof with said conductor lying substantially upon a predetermined axis;

(b) positioning at least one cutter blade in a first position wherein a cutting edge of said blade is in spaced relation to said insulation at a distance from said terminal end equal to said predetermined length;

(c) moving said cutting edge simultaneously both transversely of and toward said axis to a second position, extending a predetermined distance into said insulation and spaced from said conductor;

(d) moving said cutting edge away from said axis to a position spaced from said insulation;

(e) gripping said insulation at a position thereon between said first position and said terminal end by mechanical engagement means; and (f) moving said engagement means toward said terminal end, thereby severing said predetermined length of insulation from that remaining on said conductor and stripping it from the end portion of said conductor.

19. The method of claim 18 wherein the number of said blades is at least two.

20. The method of claim 19 wherein said engagement means comprises said blades.

21. The method of claim 18 wherein said blade and said engagement means are mounted for concurrent, reciprocal movement in directions parallel to said axis, away from and toward said terminal end.

22. The method of claim 21 wherein said engagement means is positively engaged with said insulation to cause said severing and stripping of said predetermined length thereof in only the direction toward said terminal end, and is slidingly movable along said insulation in contact therewith in the direction away from said terminal end.

* * * * *